US008961089B2

(12) United States Patent
Helstrom

(10) Patent No.: US 8,961,089 B2

(45) Date of Patent: Feb. 24, 2015

(54) FASTENER ASSEMBLY

(75) Inventor: Brad Helstrom, Colonia, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 817 days.

(21) Appl. No.: 13/250,694

(22) Filed: Sep. 30, 2011

(65) Prior Publication Data

US 2013/0081243 A1 Apr. 4, 2013

(51) Int. Cl.

| | |
|---|---|
| ***F16B 39/28*** | (2006.01) |
| ***F16B 39/00*** | (2006.01) |
| ***F16B 39/24*** | (2006.01) |
| ***B25B 5/08*** | (2006.01) |

(52) U.S. Cl.

CPC .................................... *B25B 5/08* (2013.01)

USPC ............................ 411/161; 411/134; 411/144

(58) Field of Classification Search

USPC .............. 29/244–281; 269/3, 6, 95, 214, 229, 269/217, 238–239; 411/161

See application file for complete search history.

(56) References Cited

U.S. PATENT DOCUMENTS

| | | | | |
|---|---|---|---|---|
| 5,090,855 | A * | 2/1992 | Terry | 411/144 |
| 6,317,048 | B1 | 11/2001 | Bomya | |
| 6,966,735 | B1 * | 11/2005 | Yamazaki | 411/149 |
| 8,066,096 | B1 | 11/2011 | Francisco | |
| 8,206,259 | B2 | 6/2012 | Lang | |
| 8,299,883 | B2 | 10/2012 | Katsumata | |
| 8,357,070 | B2 | 1/2013 | Duong | |
| 8,517,655 | B2 * | 8/2013 | Wang | 411/535 |
| 8,643,213 | B2 | 2/2014 | Swearingen | |
| 8,727,734 | B2 | 5/2014 | Xiao et al. | |
| 8,892,265 | B2 | 11/2014 | Swearingen et al. | |
| 2002/0015628 | A1 * | 2/2002 | Hartmann et al. | 411/161 |
| 2004/0131443 | A1 * | 7/2004 | Terry | 411/161 |
| 2004/0184868 | A1 * | 9/2004 | Jackson | 403/122 |

* cited by examiner

*Primary Examiner* — Lee D Wilson

*Assistant Examiner* — Seahee Yoon

(74) *Attorney, Agent, or Firm* — Stephen G. Mican

(57) ABSTRACT

A fastener assembly comprises: an insertion-extraction tool comprising a lever with a sleeve passing through one end from a front surface to a back surface and protruding from the back surface, a first ramp that circumscribes about one-half of the sleeve and a second ramp that circumscribes about one-half of the sleeve opposite the first ramp, the first ramp with a ramped surface that faces away from the back surface of the lever and the second ramp with a ramped surface that faces toward the back surface of the lever; and a wedge lock assembly comprising multiple wedges and a captive screw passing there through, the captive screw having a shank that passes through the sleeve of the insertion-extraction tool and a head on the distal end of the shank adjacent to the front surface of the lever of the insertion-extraction tool.

17 Claims, 8 Drawing Sheets

FIG. 2
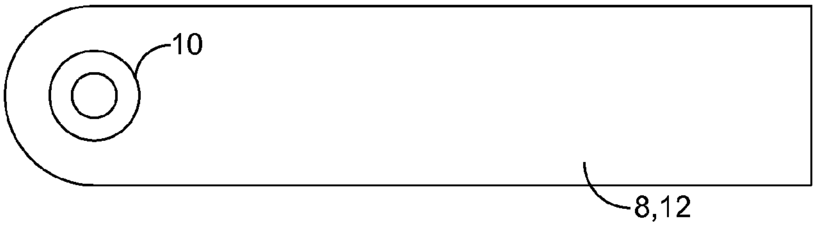
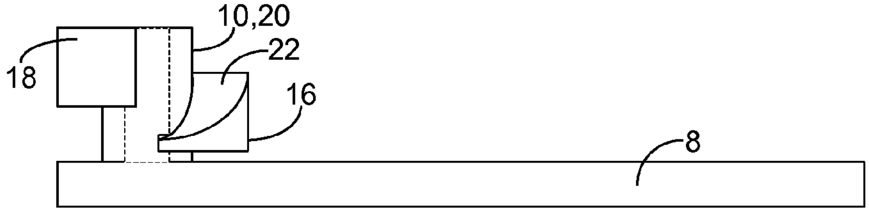
FIG. 3
FIG. 4
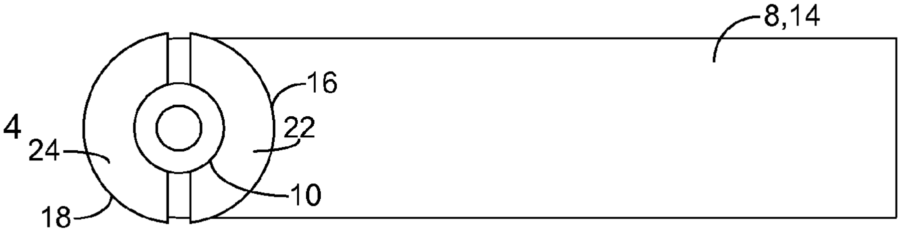
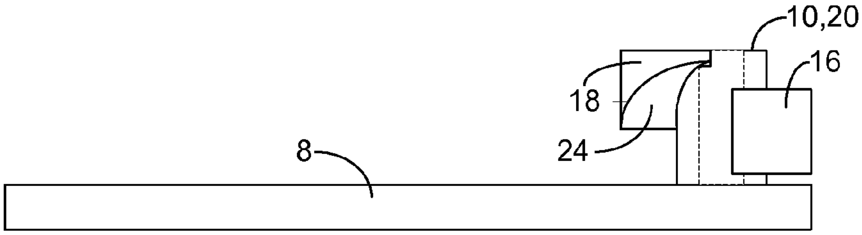
FIG. 5
FIG. 6
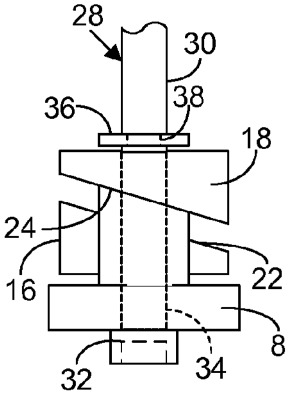

FIG. 12
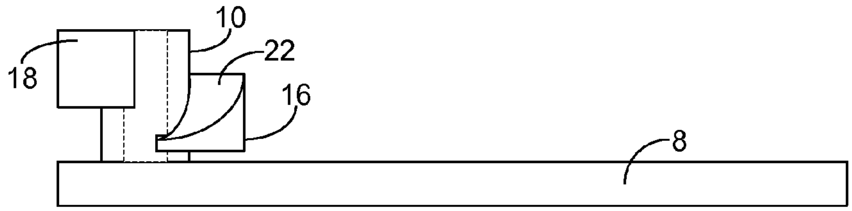
FIG. 13
FIG. 14
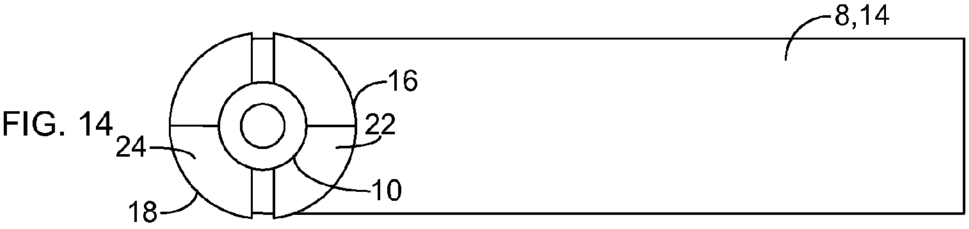
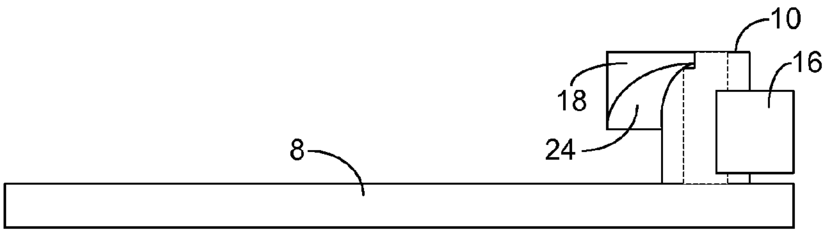
FIG. 15
FIG. 16
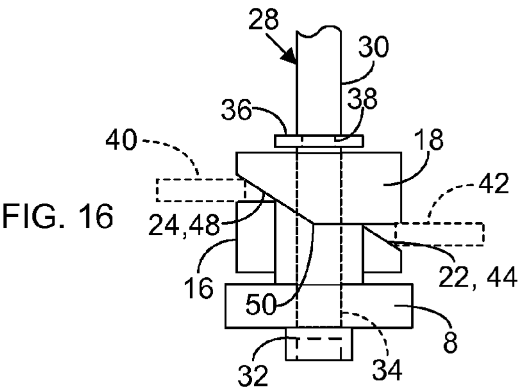

FASTENER ASSEMBLY

Figure 1:
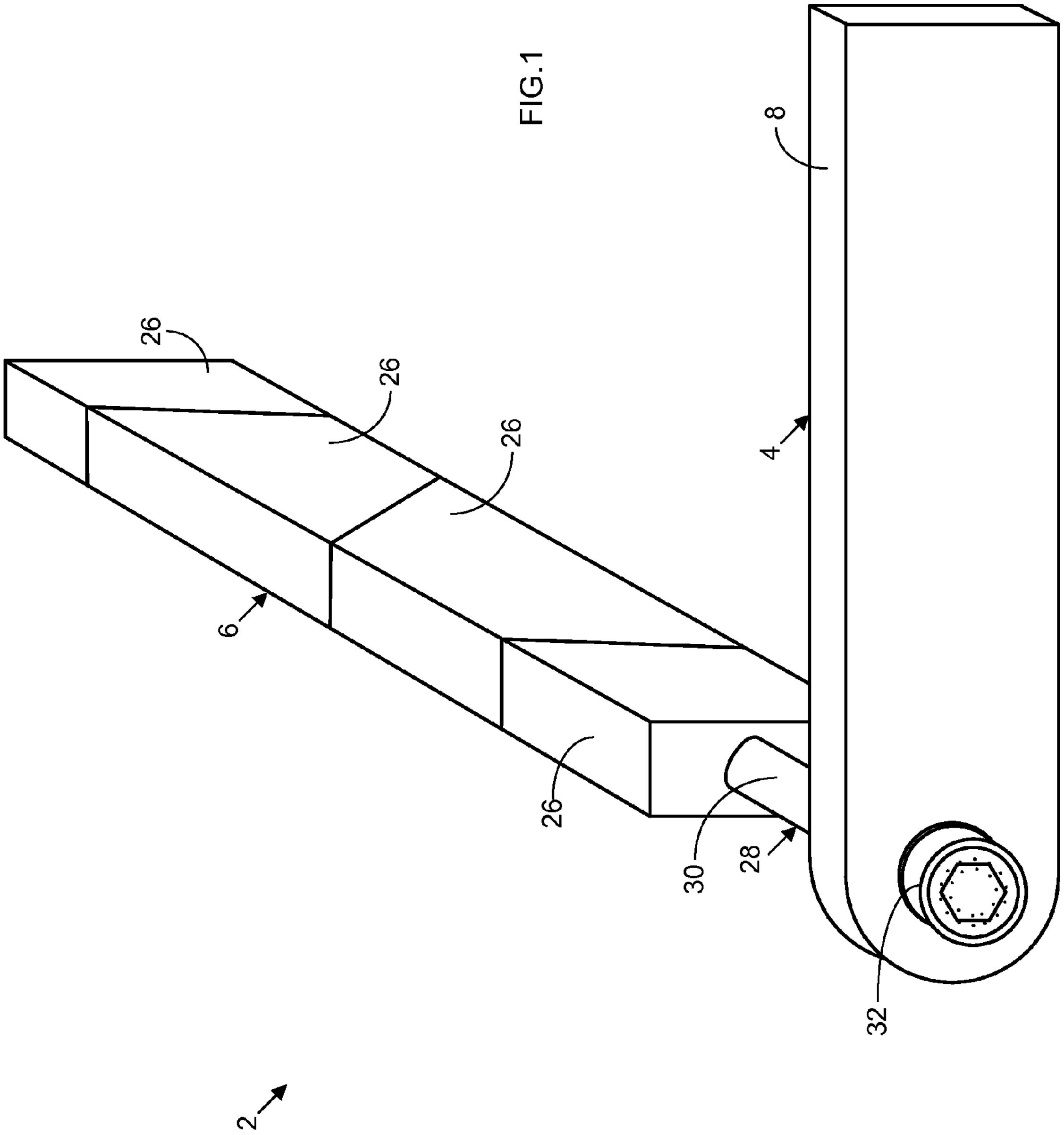
Figure 7:
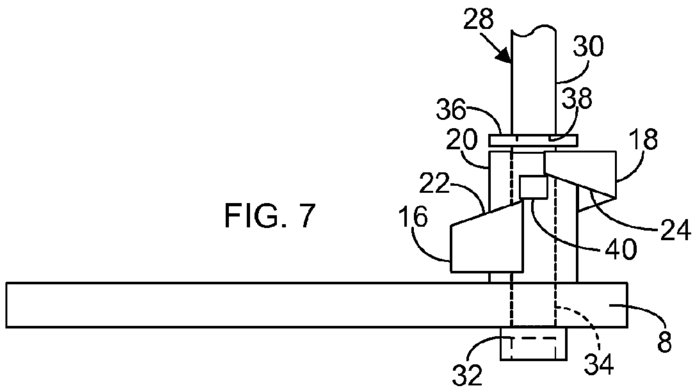
Figure 8:
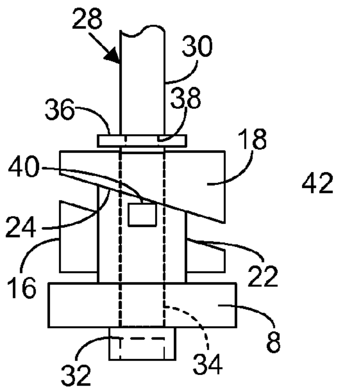
Figure 9:
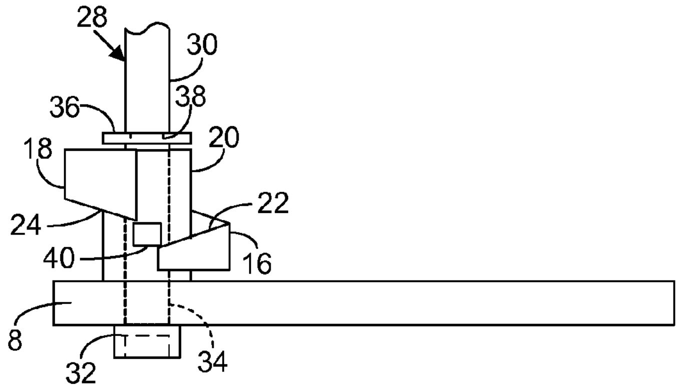
Figure 10:
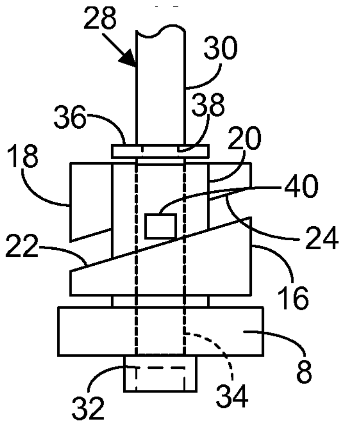
Figure 11:
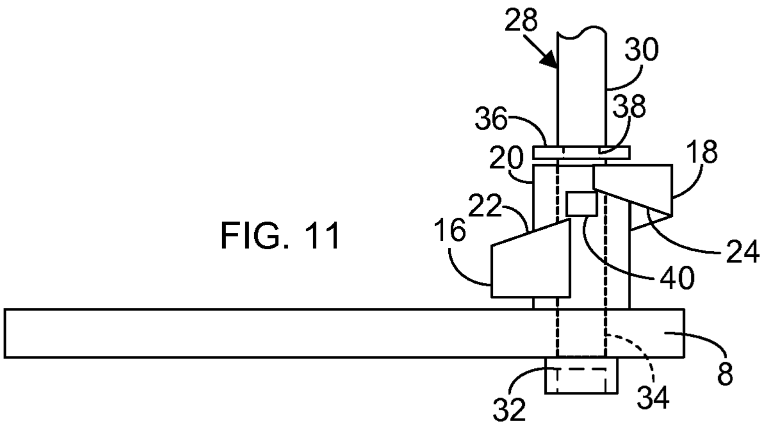
Figure 17:
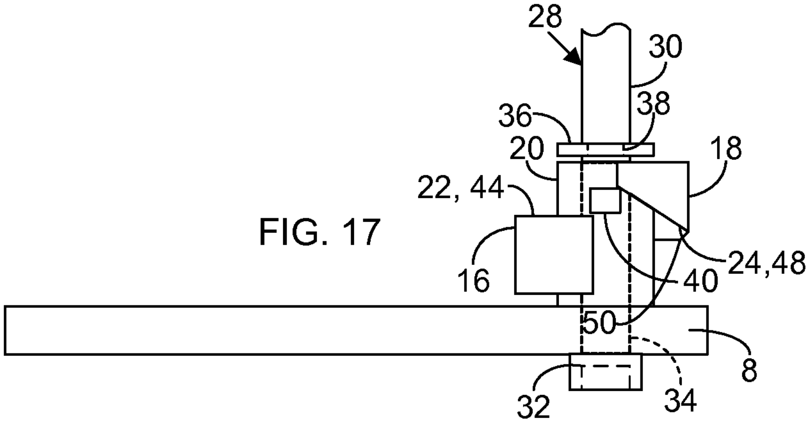
Figure 18:
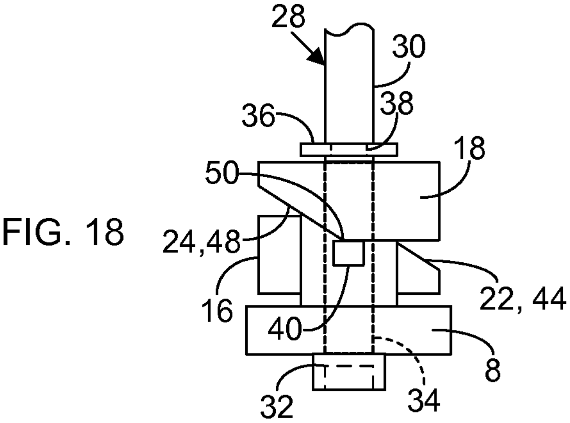
Figure 19:
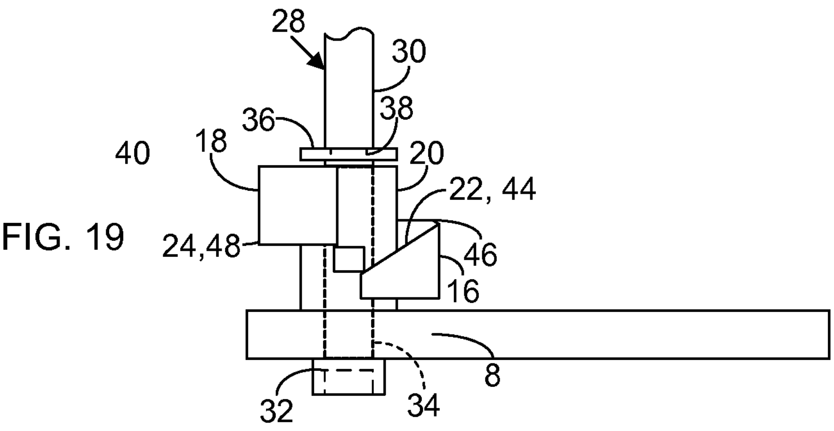
Figure 20:
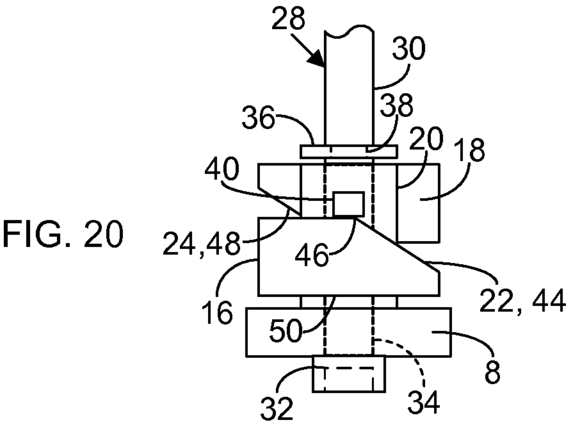
Figure 21:
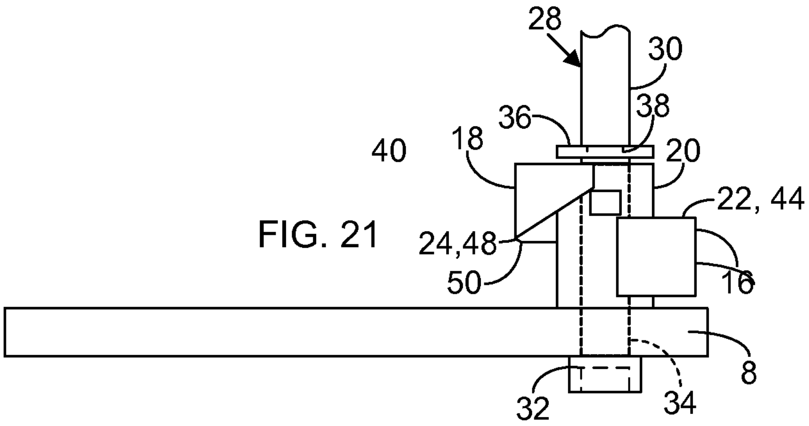
Figure 22:
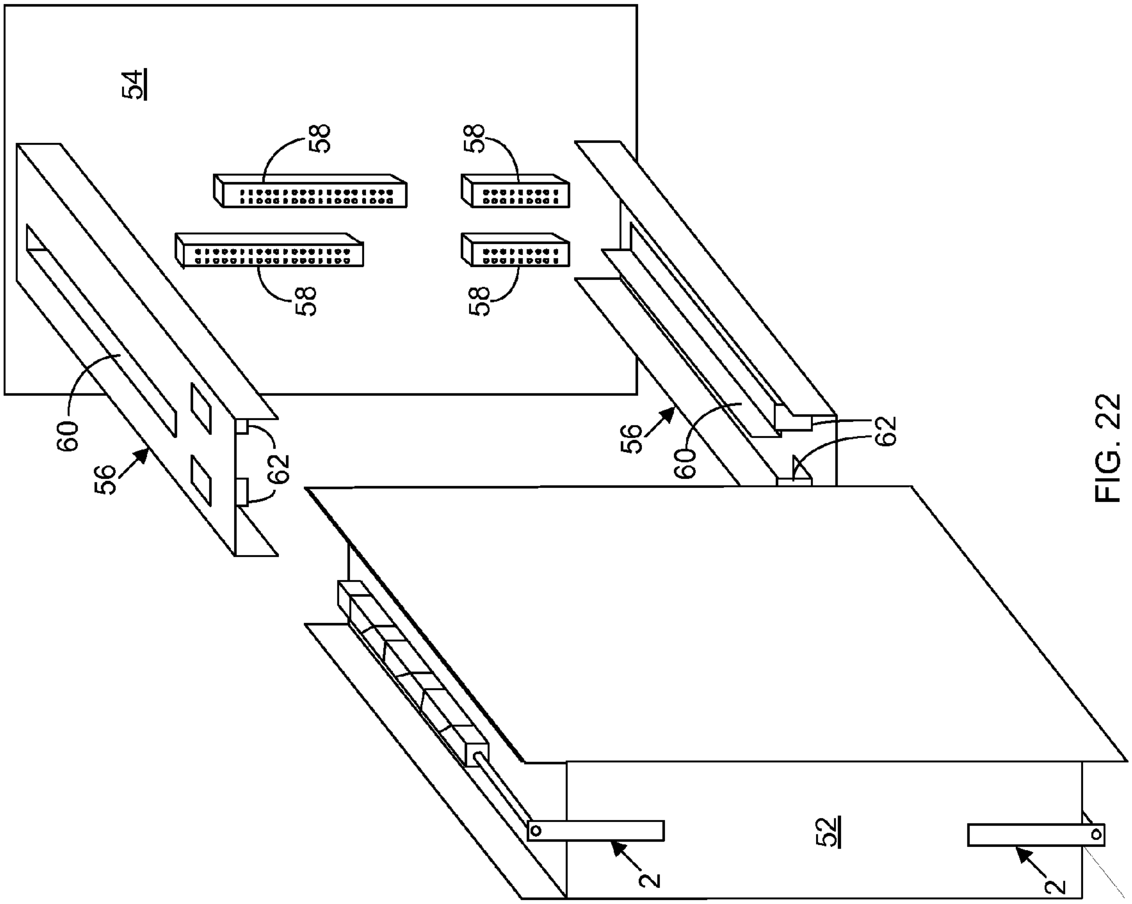

FIG. 1 is perspective front view of a fastener assembly according to at least one embodiment. FIG. 2 is a front view of an insertion-extraction tool according to a first possible embodiment. FIG. 3 is a first side view of an insertion-extraction tool according to a first possible embodiment. FIG. 4 is a back view of an insertion-extraction tool according to a first possible embodiment. FIG. 5 is a second side view of an insertion-extraction tool according to a first possible embodiment. FIG. 6 is an end view of an insertion-extraction tool according to a first possible embodiment. FIGS. 7 through 11 are side and end views of the insertion-extraction tool according to a first possible embodiment engaging a stationary surface in different degrees of rotation. FIG. 12 is a front view of an insertion-extraction tool according to a second possible embodiment. FIG. 13 is a first side view of an insertion-extraction tool according to a second possible embodiment. FIG. 14 is a back view of an insertion-extraction tool according to a second possible embodiment. FIG. 15 is a second side view of an insertion-extraction tool according to a second possible embodiment. FIG. 16 is an end view of an insertion-extraction tool according to a second possible embodiment. FIGS. 17 through 21 are side and end views of the insertion-extraction tool according to a second possible embodiment engaging a stationary surface in different degrees of rotation. FIG. 22 is a perspective front view of two of the fastener assemblies attached to a line replaceable unit designed for insertion and extraction from a backplane assembly.

Referring to FIGS. 1 through 5 together, a fastener assembly 2 according to a first possible embodiment comprises an insertion-extraction tool 4 and a wedge lock assembly 6. The insertion-extraction tool 4 comprises a lever 8 with a sleeve 10 that passes through one end of the lever 8 from a front surface 12 to a back surface 14 and protrudes from the back surface 14. A first ramp 16 adjacent to the back surface 14 of the lever 8 circumscribes about one-half of the sleeve 10 and a second ramp 18 adjacent to a distal end 20 of the sleeve 10 circumscribes about one-half of the sleeve 10 opposite the first ramp 16. The first ramp 16 has a ramped surface 22 that faces away from the back surface 14 of the lever 8 and the second ramp 18 has a ramped surface 24 that faces toward the back surface 14 of the lever 8.

The wedge lock assembly 6 comprises multiple wedges 26 and a captive screw 28 that passes there through. The captive screw 28 has a shank 30 that passes through the sleeve 10 and a head 32 on a distal end 34 of the shank adjacent to the front surface 12 of the lever 8. The head 32 of the captive screw 28 may mate with the front surface 12 of the lever 8. The captive screw 28 may be captive to the sleeve 10, such as by means of the head 32 of the captive screw 28 in combination with a retaining clip 36 that sits within a slot 38 in the shank 30 adjacent to the back surface 14 of the lever 8.

In this embodiment, the ramped surface 22 of the first ramp 16 and the ramped surface 24 of the second ramp 18 are continuous inclined surfaces that circumscribe about one-half of the sleeve 10. Referring specifically to FIG. 7 through 11, if the ramped surface 24 of the second ramp 18 engages a stationary surface, such as a stationary surface 40, and the lever 8 rotates in one sense, such as anticlockwise, the lever 8 will push the ramped surface 24 along the first stationary surface 40 and pull the captive screw 28 in a direction away from the multiple wedges 26 of the wedge lock assembly 6. After approximately one-half turn of the lever 8, the ramped surface 22 of the first ramp 16 engages the stationary surface 40 and continued rotation of the lever 8 pushes the captive screw 28 in a direction toward the multiple wedges 26 of the wedge lock assembly 6. After another approximately one-half turn of the lever 8, the ramped surface 24 of the second ramp 18 again engages the stationary surface 40 to repeat the process.

According to the first embodiment, using the first ramp 16 and the second ramp 18 of the insertion-extraction tool 4 to engage a stationary surface, such as the stationary surface 40, one-half turn of the lever 8 of the insertion-extraction tool 4 in one sense of rotation, such as anticlockwise, results in the insertion-extraction tool 4 pulling the wedge lock assembly 6 toward the insertion-extraction tool 4 and a further one-half turn of the lever 8 of the insertion-extraction tool in the same sense of rotation results in the insertion-extraction tool 4 pushing the wedge lock assembly 6 away from the insertion-extraction tool 4. Of course, reversal of the inclined surfaces of the ramped surfaces 22 and 24 of the first ramp 16 and the second ramp 18 would result in the opposite sense of rotation having the same effect.

Referring to FIGS. 12 through 16 together, the fastener assembly 2 according to a second possible embodiment also comprises the insertion-extraction tool 4 and the wedge lock assembly 6. The only difference from the first embodiment described in connection with FIGS. 1 through 6 is that the first ramp 18 and the second ramp 18 have discontinuous inclined surfaces along their respective ramp surfaces 22 and 24. In particular, the ramped surface 22 has a discontinuous inclined surface 44 that extends from one end to mid-way along the ramped surface 22 to a discontinuity indicated by a surface edge 46, so that the discontinuous inclined surface 42 circumscribes about one-quarter of the sleeve 10. Likewise, the ramped surface 24 has a discontinuous inclined surface 48 that extends from one end to mid-way along the ramped surface 24 to a discontinuity indicated by a surface edge 50, so that the discontinuous inclined surface 48 circumscribes about one-quarter of the sleeve 10.

Referring to FIGS. 17 through 21 together, if the discontinuous inclined surface 48 of the ramped surface 24 of the second ramp 18 engages a stationary surface, such as the stationary surface 40, and the lever 8 rotates in one sense, such as anticlockwise, to push the discontinuous inclined surface 48 of the ramped surface 24 along the stationary surface 40, the rotation will serve to pull the captive screw 28 in a direction away from the multiple wedges 26 of the wedge lock assembly 6 for approximately one-quarter turn of the lever 8. After approximately another one-quarter turn of the lever 8, the discontinuous inclined surface 46 of the ramped surface 22 of the first ramp 16 engages the stationary surface 40 to push the captive screw 28 in a direction toward the multiple wedges 26 of the wedge lock assembly 6 for another approximately one-quarter turn of the lever 8. After another approximately one-quarter turn of the lever 8, the discontinuous inclined surface 48 of the ramped surface 24 of the second ramp 18 again engages the stationary surface 40 to repeat the process.

According to the second embodiment, using the first ramp 16 and the second ramp 18 of the insertion-extraction tool 4 to engage a stationary surface, one-half turn of the lever 8 of the insertion-extraction tool 4 in one sense of rotation, such as anticlockwise, results in the insertion-extraction tool 4 pushing the wedge lock assembly 6 in a direction away from the insertion-extraction tool 4 and a further one-half turn of the lever 8 of the insertion-extraction tool 4 in the same sense of rotation results in the insertion-extraction tool 4 pulling the wedge lock assembly 6 in a direction toward the insertion-extraction tool 4. Of course, reversal of the inclined surfaces of the ramped surfaces 22 and 24 of the first ramp 16 and the second ramp 18 would result in the opposite sense of rotation having the same effect.

FIG. 22 is a perspective front view of two of the fastener assemblies 2 attached to a line replaceable unit (LRU) 52 designed for insertion and extraction from a backplane assembly 54. The LRU 52 slides into guides 56 mounted on the backplane assembly 54 and mates with connectors 58 on the backplane assembly 54. Each guide 52 may have a wedge lock brace 60 for engaging the wedge lock assembly 6 of a respective one of the fastener assemblies 2. Each guide 56 may have at least one stationary surface, such as extractor brace tabs 62, that engage the first ramp 16 and the second ramp 18 of the insertion-extraction tool 4 of a respective one of the fastener assemblies 2 in the same way as the described stationary surface 40 engages the first ramp 16 and the second ramp 18 of the insertion-extraction tool 4.

Referring to FIGS. 1 through 12 together, insertion of the LRU 52 into the backplane assembly 54 involves sliding the LRU 52 into the guides 56 against the connectors 58 on the backplane assembly 54, engaging the second ramp 18 of the insertion-extraction tool 4 of each respective fastener assembly 2 onto one of the extractor brace tabs 62, and then giving the insertion-extraction tool 4 a half-turn anticlockwise, in the case of the first embodiment of the fastener assembly 2, or a quarter-turn, in the case of the second embodiment of the fastener assembly 2, pushes the LRU 52 to mate with the connectors 58 of the backplane assembly 54. Then tightening the captive screw 28 of the wedge lock assembly 6 of each respective fastener assembly 2 will tighten the multiple wedges 26 of each wedge lock assembly 6 between the respective wedge lock braces 60 and the LRU 52 to hold the LRU 52 securely in place.

Extraction of the LRU 52 from the backplane assembly 54 involves loosening the captive screw 28 of the wedge lock assembly 6 of each fastener assembly 2 to loosen the wedges 26, then engaging the first ramp 16 of the insertion-extraction tool 4 of each respective fastener assembly 2 onto one of the extractor brace tabs 62, and then giving the insertion-extraction tool 4 a half-turn anticlockwise, in the case of the first embodiment of the fastener assembly 2, or a quarter-turn, in the case of the second embodiment of the fastener assembly 2, to pull the LRU 52 out of the connectors 58 of the backplane assembly 54.

The described embodiments as set forth herein represent only some illustrative implementations of the invention as set forth in the attached claims. Changes and substitutions of various details and arrangement thereof are within the scope of the claimed invention.

The invention claimed is:

1. A fastener assembly, comprising:

an insertion-extraction tool comprising a lever with a sleeve passing through one end from a front surface to a back surface and protruding from the back surface, a first ramp that circumscribes about one-half of the sleeve and a second ramp that circumscribes about one-half of the sleeve opposite the first ramp, the first ramp with a ramped surface that faces away from the back surface of the lever and the second ramp with a ramped surface that faces toward the back surface of the lever; and a wedge lock assembly comprising multiple wedges and a captive screw passing there through, the captive screw having a shank that passes through the sleeve of the insertion-extraction tool and a head on the distal end of the shank adjacent to the front surface of the lever of the insertion-extraction tool.

2. The fastener assembly of claim 1, wherein the ramped surfaces of the first ramp and the second ramp of the insertion-extraction tool each have a continuous inclined surface that circumscribes about one-half of the sleeve.

3. The fastener assembly of claim 1, wherein the ramped surfaces of the first ramp and the second ramp of the insertion-extraction tool each have a discontinuous inclined surface that circumscribes about one-quarter of the sleeve.

4. The fastener assembly of claim 1, wherein the first and second ramps of the insertion-extraction tool are on opposite ends of the sleeve.

5. The fastener assembly of claim 1, wherein the head of the captive screw of the wedge lock assembly mates the front surface of the lever of the insertion-extraction tool.

6. The fastener assembly of claim 5, wherein the captive screw is captive to the sleeve of the insertion-extraction tool.

7. The fastener assembly of claim 1, wherein rotation of the captive screw of the wedge lock assembly shifts the position of the multiple wedges of the wedge lock assembly.

8. The fastener assembly of claim 1, wherein rotation of the lever of the insertion-extraction tool in one sense whilst one of the ramped surfaces of the first and second ramps engages a stationary surface causes the captive screw in the wedge lock assembly to move in a direction toward the multiple wedges of the wedge lock assembly and rotation of the lever in the same sense whilst the other one of the ramped surfaces of the first and second ramps engages the stationary surface causes the captive screw in the wedge lock assembly to move in a direction toward the multiple wedges of the wedge lock assembly.

9. A fastener assembly, comprising:

an insertion-extraction tool comprising a lever with a sleeve passing through one end from a front surface to a back surface and protruding from one the back surface, a first ramp along one end of the sleeve that circumscribes about one-half of the sleeve and a second ramp along the other end of the sleeve that circumscribes about one-half of the sleeve opposite the first ramp, the first ramp with a ramped surface that faces away from the lever and the second ramp with a ramped surface that faces toward the back surface of the lever; and a wedge lock assembly comprising multiple wedges and a captive screw passing there through that is captive to the wedge lock assembly and the sleeve of the insertion-extraction tool, the captive screw having a shank that passes through the sleeve of the insertion-extraction tool and a head on the distal end of the shank adjacent to the front surface of the lever that retains the insertion-extraction tool on the shank of the captive screw.

10. The fastener assembly of claim 9, wherein the ramped surfaces of the first ramp and the second ramp of the insertion-extraction tool each have a continuous inclined surface that circumscribes about one-half of the sleeve.

11. The fastener assembly of claim 9, wherein the ramped surfaces of the first ramp and the second ramp of the insertion-extraction tool each have a discontinuous inclined surface that circumscribes about one-quarter of the sleeve.

12. The fastener assembly of claim 9, wherein rotation of the captive screw of the wedge lock assembly shifts the position of the wedges of the wedge lock assembly.

13. The fastener assembly of claim 9, wherein rotation of the lever of the insertion-extraction tool in one sense whilst one of the ramped surfaces of the first and second ramps engages a stationary surface causes the captive screw in the wedge lock assembly to move in a direction toward the multiple wedges of the wedge lock assembly and rotation of the lever in the same sense whilst the other one of the ramped surfaces of the first and second ramps engages the stationary surface causes the captive screw in the wedge lock assembly to move in a direction toward the multiple wedges of the wedge lock assembly.

14. A fastener assembly, comprising:

an insertion-extraction tool comprising a lever with a sleeve passing through one end from a front surface to a back surface and protruding from the back surface, a first ramp along one end of the sleeve that circumscribes about one-half of the sleeve and a second ramp along the other end of the sleeve that circumscribes about one-half of the sleeve opposite the first ramp, the first ramp with a ramped surface that faces away from the lever and the second ramp with a ramped surface that faces toward the back surface of the lever; and a wedge lock assembly comprising multiple wedges and a captive screw passing there through that is captive to the wedge lock assembly and the sleeve of the insertion-extraction tool, the captive screw having a shank that passes through the sleeve of the insertion-extraction tool and a head on the distal end of the shank adjacent to the front surface of the lever that retains the insertion-extraction tool on the shank of the captive screw;

wherein rotation of the lever of the insertion-extraction tool in one sense whilst one of the ramped surfaces of the first and second ramps engages a stationary surface causes the captive screw in the wedge lock assembly to move in a direction toward the multiple wedges of the wedge lock assembly and rotation of the lever in the same sense whilst the other one of the ramped surfaces of the first and second ramps engages the stationary surface causes the captive screw in the wedge lock assembly to move in a direction toward the multiple wedges of the wedge lock assembly.

15. The fastener assembly of claim 14, wherein the ramped surfaces of the first ramp and the second ramp of the insertion-extraction tool each have a continuous inclined surface that circumscribes about one-half of the sleeve.

16. The fastener assembly of claim 14, wherein the ramped surfaces of the first ramp and the second ramp of the insertion-extraction tool each have a discontinuous inclined surface that circumscribes about one-quarter of the sleeve.

17. The fastener assembly of claim 14, wherein rotation of the captive screw of the wedge lock assembly shifts the position of the multiple wedges of the wedge lock assembly.

* * * * *